(12) United States Patent
Schultz et al.

(10) Patent No.: US 7,555,591 B2
(45) Date of Patent: Jun. 30, 2009

(54) METHOD AND SYSTEM OF MEMORY MANAGEMENT

(75) Inventors: Russell Alvin Schultz, Austin, TX (US); David A. Moore, Cedar Park, TX (US); Matthew Henson, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 644 days.

(21) Appl. No.: 11/118,587

(22) Filed: Apr. 29, 2005

(65) Prior Publication Data

US 2006/0248264 A1 Nov. 2, 2006

(51) Int. Cl.
*G06F 12/08* (2006.01)
(52) U.S. Cl. .................. 711/6; 711/3; 711/165; 711/202; 711/203; 711/206
(58) Field of Classification Search .......... 711/3, 711/6, 165, 170, 202–203, 206
See application file for complete search history.

(56) References Cited

U.S. PATENT DOCUMENTS

| | | | |
|---|---|---|---|
| 6,601,083 B1 * | 7/2003 | Reznak | 709/104 |
| 7,093,258 B1 * | 8/2006 | Miller et al. | 718/105 |
| 2002/0108025 A1 * | 8/2002 | Shaylor | 711/203 |
| 2004/0111574 A1 * | 6/2004 | Pina et al. | 711/159 |
| 2004/0128452 A1 | 7/2004 | Schmisseur et al. | |

FOREIGN PATENT DOCUMENTS

| WO | WO 2004/006105 | 1/2004 |
|---|---|---|
| WO | WO 2004/061676 | 7/2004 |

OTHER PUBLICATIONS

Chanik Park et al., Compiler-Assisted Demand Paging for Embedded Systems with Flash Memory, EMSOFT '04, Sep. 27-29, 2004, pp. 114-123, Pisa, Italy.

* cited by examiner

*Primary Examiner*—Jasmine Song
(74) *Attorney, Agent, or Firm*—Toler Law Group

(57) ABSTRACT

The disclosure is directed to a computational system including a processor, cache memory accessible to the processor, and a memory management unit accessible to the processor. The processor is configured to access a virtual memory space to perform a first task and is configured to access the virtual memory space to perform a second task. The virtual memory space references first and second sets of task instructions associated with the first and second tasks, respectively. The virtual memory space references non-instruction data associated with the first task. The cache memory is configured to store the first set of task instructions and the non-instruction data. The memory management unit is configured to determine the physical memory location of the second set of task instructions. The computational system is configured to not write the first set of task instructions and the non-instruction data to a physical location beyond the cache memory.

18 Claims, 2 Drawing Sheets

METHOD AND SYSTEM OF MEMORY MANAGEMENT

FIELD OF THE DISCLOSURE

This disclosure, in general, relates to methods and systems of memory management.

BACKGROUND

Consumer electronic devices, such as cell phones, digital music players, and other handheld devices, run increasingly complicated algorithms, such as algorithms for decoding compressed digital audio and video data. As the complexity of these algorithms increases, so too does the memory usage for storing the algorithms.

Generally, instructions to be executed are stored in a dedicated instruction cache of a microprocessor. For large algorithms, the set of instructions become too large to fit on the dedicated instruction cache. This capacity deficit results in cycles of loading a subset of the instructions into the dedicated instruction cache from non-volatile memory, executing instructions of the subset and swapping the subset out for the next subset of instructions. In addition to the time required to load instructions, writing instructions from memory to the cache occupies the system bus. Frequently accessing non-volatile memory also reduces the throughput of data into the microprocessor.

In real-time processing, such as decoding audio and video for playback, these delays can decrease the performance of a device. To reduce memory access latency, designers have turned to small intermediate level caches to retrieve and store frequently used instruction sets for easier access by the microprocessor. These small intermediate level caches are referred to as level 2 or level 3 caches and are typically static random access memory (SRAM) devices located close to the microprocessor. However, SRAM is expensive and increases product cost.

To manage access to instruction sets and data, typical systems rely on manual overlays in which a programmer manages memory by programmatically moving code into a desired location prior to use. Often, instruction sets are overwritten as new instruction sets are used. Such systems rely on the programmer to correctly allocate memory and move instructions and data to desired locations prior to accessing the instructions and data. For large programs and systems running many tasks, such memory management is difficult, especially when more than one programmer is coding system instructions.

Alternatively, systems may use a memory management unit. Each task, such as word processing, spreadsheets, and user interface interaction, is provided with a virtual memory space. As the processor accesses a particular virtual memory space to perform a particular task, the instructions and data associated with that task are moved to physical memory locations more easily accessed by the processor, such as to level 2 cache. The memory management unit maintains a record of the location of the instructions and data in the physical memory. Instructions and data associated with tasks other than the particular task being executed may be written to non-volatile storage, such as hard drives, or may be written to higher-level cache. However, task specific virtual addressing as implemented in traditional memory management units results in a significant amount of disk access and, as a result, large power consumption. Frequently accessing non-volatile storage can also lead to delays when switching between tasks. In another embodiment, large higher-level caches, such as SRAM, are used. These higher-level caches are typically expensive and consume power. As such, typical memory management unit implementation is unsuitable for portable devices and other devices with limited access to power.

As such, an improved system and method of memory management would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

Figure 1:
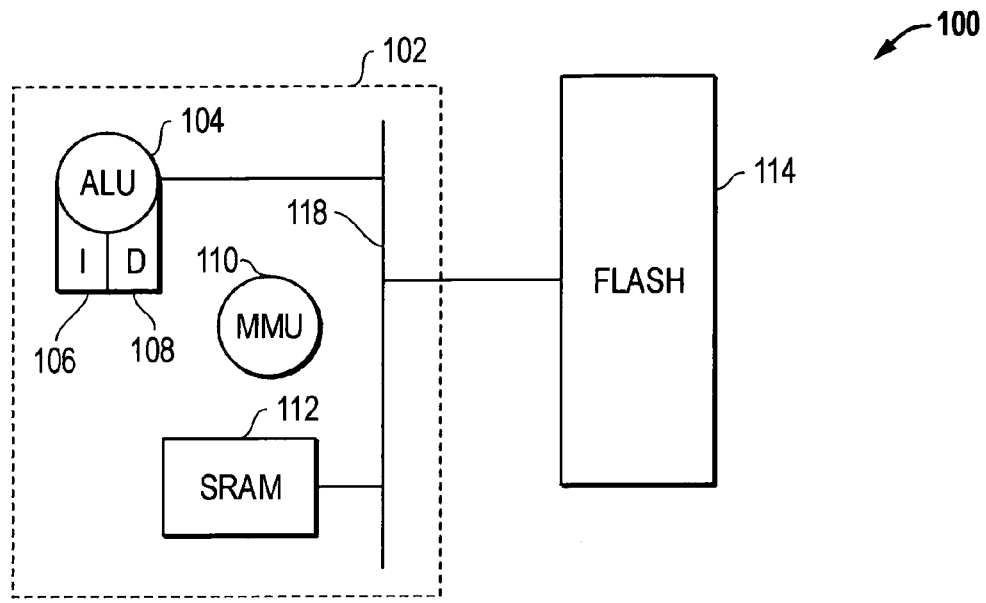
FIG. 1 includes an illustration of an exemplary computational system.

In one particular embodiment, the disclosure is directed to a computational system including a processor and a memory management unit. The processor is configured to access a particular virtual memory space when performing a plurality of tasks. In one embodiment, the virtual memory space references instruction sets of the plurality of tasks and non-instruction data. When accessed, the instruction sets are moved from non-volatile storage to volatile storage or cache storage. Generally, an instruction set associated with a particular task is not written to the non-volatile storage when a different task is performed. In addition, non-instruction data associated with the particular task may not be written to non-volatile storage when a different task is performed.

In one embodiment, the computational system includes a cache memory located on a substrate common to the processor. Alternatively, the cache may be located separately from the processor. Further, the computational system may include non-volatile storage, such as indirectly addressable secondary data or program store.

In one particular embodiment, the disclosure is directed to a computational system including a processor, cache memory accessible to the processor, and a memory management unit accessible to the processor. The processor is configured to access a virtual memory space to perform a first task of a plurality of tasks and is configured to access the virtual memory space to perform a second task of the plurality of tasks. The virtual memory space references a first set of task instructions associated with the first task and references a second set of task instructions associated with the second task. The virtual memory space references non-instruction data associated with the first task. The cache memory is configured to store the first set of task instructions and the non-instruction data. The memory management unit is configured to determine a physical memory location of the second sets of task instructions. The second set of task instructions are written to the cache memory when the second set of task instructions is accessed by the processor. The processor is configured to not write the first set of task instructions and the non-instruction data to a physical location beyond the cache memory.

In another embodiment, the disclosure is directed to a method of managing memory. The method includes storing a first set of task instructions and non-instruction data associated with a first task in cache memory and accessing a second set of task instructions associated with a second task via a virtual address space. The virtual address space references the first set of task instructions, the second set of task instructions, and the non-instruction data. The method further includes storing the second set of task instructions in the cache memory without writing the non-instruction data to a physical memory location outside the cache memory.

In a further exemplary embodiment, the disclosure is directed to a computational system including physical memory storage including computer implemented instructions operable by a processor to perform a method. The method includes storing a first set of task instructions and non-instruction data associated with a first task in cache memory and accessing a second set of task instructions associated with a second task via a virtual address space. The virtual address space references the first set of task instructions, the second set of task instructions, and the non-instruction data. The method further includes storing the second set of task instructions in the cache memory without writing the non-instruction data to a physical memory location outside the cache memory.

FIG. 1 is a block diagram illustrating an exemplary computational system 100 that includes a substrate 102. The substrate 102 includes a processor 104, dedicated instruction cache 106 accessible to the processor 104, and dedicated data cache 108 accessible to the processor 104. The processor 104 is connected to a data bus 118. In one embodiment, the processor 104 is an arithmetic logic unit, such as an ARM® processor.

A general purpose cache memory 112, such as static random access memory (SRAM), is coupled to the data bus 118. The general purpose cache 112 may be located on the substrate 102 in common with the processor 104. For example, the general purpose cache 112 and the processor 104 may be formed on a common silicon substrate. Alternatively, the general purpose cache 112 may be located separately from the processor 104.

In one particular embodiment, the computational system 100 includes a memory management unit (MMU) 110. The MMU 110 may be located on the substrate common to the processor 104. In one exemplary embodiment, the MMU 110 includes a table for matching virtual addresses to physical addresses, such as a Translation Look-aside Buffer (TLB). Requests for memory access are intercepted by the MMU 110, which determines the physical memory location of a virtual address.

In another exemplary embodiment, the computational system 100 includes non-volatile storage 114 accessible to the processor 104 via the data bus 118. An exemplary embodiment of the non-volatile storage 114 includes indirectly addressable secondary data or program store, such as flash memory including, for example, NAND flash memory. The non-volatile storage 114 includes sets of task instructions. Each set of task instructions is associated with a task. In one embodiment, a task is implemented as a program operable by the processor 104 to perform a function. In one particular embodiment, the sets of task instructions are read-only instruction sets. The non-volatile storage 114 may also include non-instruction data.

When performing a task, the processor 104 accesses a set of task instructions associated with the task via a virtual memory space. For example, the set of task instructions is operable by the processor 104 to reference data and subsequent instructions via the virtual memory space. The MMU 110 determines the physical location of the referenced instructions. For example, the MMU 110 includes a table translating between the virtual address of the instructions and the physical location of the instructions. In one embodiment, accessed instructions are moved from the non-volatile storage 114 to the general purpose cache 112 for faster access by the processor. The MMU 110 updates the virtual address map to indicate that the new instruction set is available. When a second task is performed, the processor accesses a second set of task instructions by accessing the virtual memory space.

Figure 2:
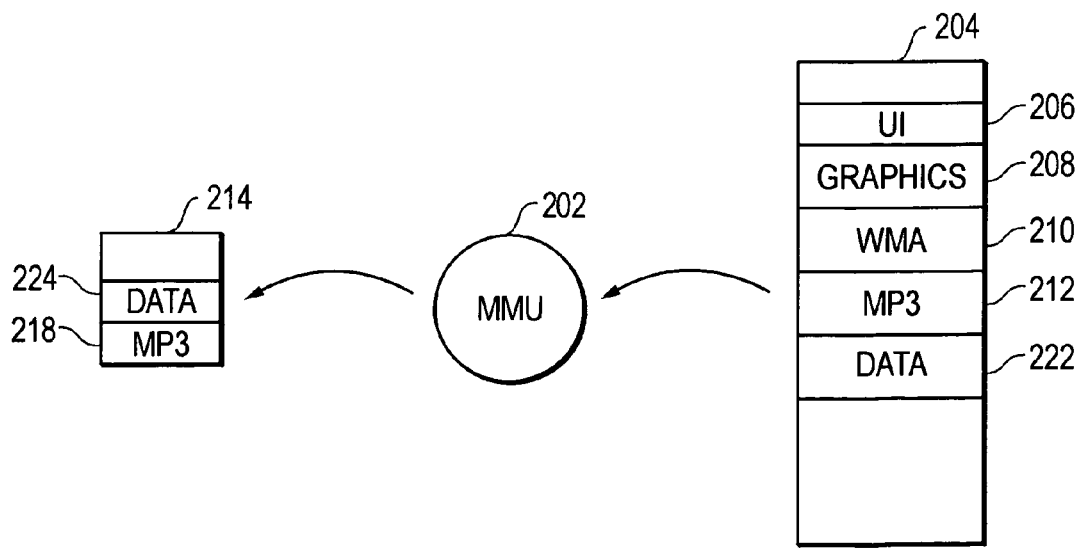
FIGS. 2 and 3 include illustrations of an exemplary embodiment of a memory management unit, such as for use in the exemplary computational system illustrated in FIG. 1.
Figures 3, 4:
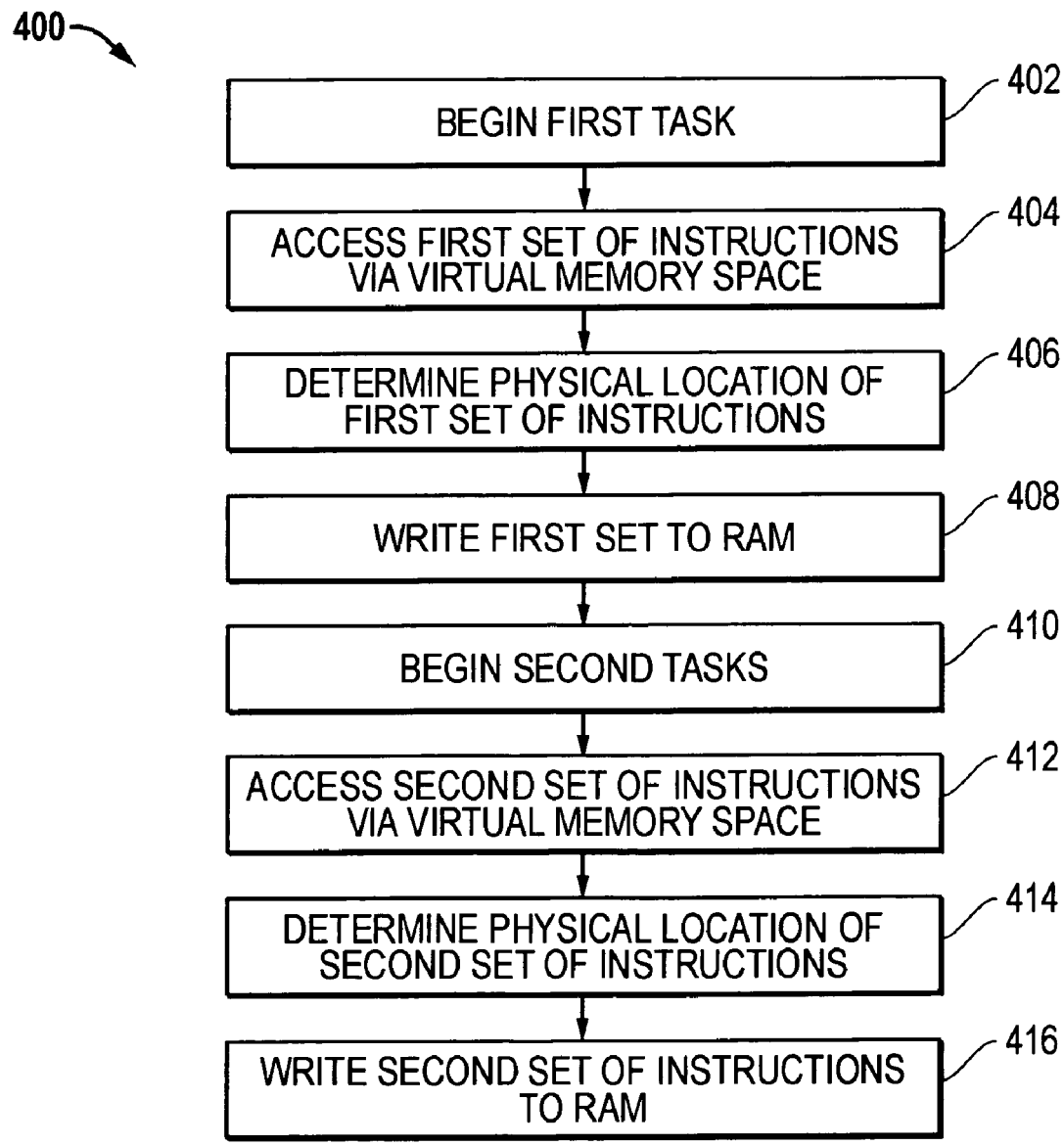
FIG. 4 includes an illustration of an exemplary method for use by a computational system, such as the exemplary computational system illustrated in FIG. 1.

FIGS. 2 and 3 include illustrations of virtual memory space translation. When the processor accesses an instruction via a virtual address of the virtual memory space 204, the MMU 202 translates the virtual address to a physical location. The physical location may, for example, be a physical address on the general purpose cache 214.

The virtual memory space 204 includes references to instruction sets. In one embodiment, the virtual memory space 204 includes a reference to a first set of instructions associated with a first task, a second set of instructions associated with a second task, and a third set of instructions associated with a third task. For example, the virtual memory space 204 may include an instruction set for a user interface implementation 206, an instruction set for graphic generation 208, and instruction sets for compressed file decoding, such as Windows Media Audio (WMA) decompression 210 and MP3 (Movie Picture Experts Group (MPEG)-1 audio layer 3) decompression 212. In other exemplary embodiments, the virtual memory space 204 may reference instruction sets for decompressing files with Advanced Audio Coding (AAC), MPEG, Joint Photographic Experts Group (JPEG), Ogg Vodis (OGG) or other compression formats. As such, the processor may access a particular virtual memory space 204 to perform a plurality of tasks. In addition, the virtual memory space 204 may reference non-instruction data 222.

For example, virtual addresses representing MP3 decompression instructions 212 may be translated to a physical location 218 on the general purpose cache 214 on which the MP3 decompression instructions 212 are stored. In another example, the virtual addresses representing non-instruction data 222 may be translated to a physical location 224 on the general purpose cache 214 when the non-instruction data 224 is located on the general purpose cache 214. In another example, the processor may access an instruction set, such as the user interface instruction set 206, located in non-volatile storage and not located on the general purpose cache 214.

When the processor accesses instructions to perform a particular task, the MMU 202 translates the virtual address to a physical address. For example, the MMU 202 may include a table, such as the table illustrated in FIG. 3. FIG. 3 includes a representation of a translation table but is not intended to illustrate a particular address format. When the MMU 202 receives a virtual address, the MMU 202 translates the virtual address to a physical location. For example, when the processor accesses a virtual address 0x1000, the MMU 202 may translate the virtual address to the physical address 0x9000, such as a first physical location on the general purpose cache 214. In another example, the virtual address 0x3000 may be translated to a physical address 0x8000, such as to a second physical location on the general purpose cache 214. In a further example, the MMU 202 may determine that instructions or non-instruction data located at a virtual address, such as 0x2000, are not located at a physical location associated with the general purpose cache.

Based on the determined physical location of the accessed instructions, instructions may be written to the general purpose cache 214 from non-volatile storage. Returning to FIG. 2, when the processor accesses the virtual address space, the MMU 202 provides a translation. When the instructions are located on the general purpose cache 214, such as, for example, the MP3 instruction set 212 at location 218, the processor may move portions of the instructions to the dedicated instruction cache for execution.

When the general purpose cache 214 is full, older instructions may be overwritten by instructions accessed more recently. In one embodiment, the older instructions are not written to a physical memory location, such as the non-volatile storage, beyond or outside the general purpose cache 214. The MMU updates the virtual address map to indicate the new instruction set availability.

The virtual memory space may also reference non-instruction data physically located at the general purpose cache 214. When the processor changes tasks, the non-instruction data associated with previous tasks may be maintained in the general purpose memory 214. Alternatively, the non-instruction data may be overwritten with non-instruction data associated with the new task or with instructions associated with the new task. In one particular embodiment, when non-instruction data is overwritten on the general purpose cache 214, the non-instruction data is not written to the non-volatile storage.

Turning to FIG. 4, the computational system may manage memory in accordance with the illustrated method 400. When the processor begins a first task, as illustrated at 402, the processor may access a first set of instructions via the virtual memory space, as illustrated at 404. The virtual memory space includes references to instruction sets associated with one or more tasks. A task may, for example, include user interface interaction, graphic generation, or compressed file decoding. In one exemplary embodiment, a compressed file decoding task includes MP3 decoding, WMA decoding, AAC decoding, JPEG decoding, MPEG decoding, or MP4 decoding.

To perform the task, an MMU determines the physical location of the first set of instructions, as illustrated at 406. For example, the MMU may translate a virtual address to a physical address based on entries in a table. When an instruction set is located at a physical location that is easily accessed by the processor, such as a general purpose cache, the processor may access the instruction set, writing portions of the instruction set to a dedicated instruction cache.

However, when the instruction set is located at a physical location other than the general purpose cache, the instruction set is written to the general purpose cache, such as on-chip RAM, as illustrated at 408. For example, when the instruction set is located on non-volatile storage, the instruction set may be read from the non-volatile storage and written to the general purpose cache. In one particular embodiment, instruction sets located on the non-volatile storage are read-only instruction sets. The MMU updates the virtual address map to indicate the new instruction set is available.

The processor may perform a second task, as illustrated at 410. In one embodiment, the processor performs the first task at a first time and performs the second task at a second time. For example, the processor may begin decoding a file with a different compression format or may switch to a user interface task from a decoding task. In contrast to traditional memory management, the processor accesses a second set of instructions associated with the second task via the virtual address space accessed when performing the first task, as illustrated at 412. An MMU determines the physical location of the second set of instructions associated with the second task, as illustrated at 414. Based on the physical location, the second set of instructions may be written to general purpose cache, such as on-chip RAM, as illustrated at 416.

In one embodiment, older instructions, such as portions of the first instruction set located on the general purpose cache may be overwritten with instructions, such as the second instruction set, associated with a task being performed. The older instruction sets, such as the first instruction set, are not written to the non-volatile storage. In one particular embodiment, non-instruction data associated with performance of the first task is not written to the non-volatile storage. The non-instruction data may be maintained in the general purpose cache or overwritten with non-instruction data or instructions associated with newer tasks.

In one particular embodiment, the non-instruction data associated with the first task is maintained in the general purpose cache memory. The processor may access the first instruction set to perform the first task again after performing the second task. The first instruction set may be loaded in the general purpose cache from non-volatile memory and the non-instruction data maintained in the general purpose cache may be accessed. For example, a portion of the second instruction set may be overwritten by the first instruction set and the MMU may be updated to translate the virtual address of the first instruction set and non-instruction data to physical addresses located on the general purpose cache. The second instruction set and non-instruction data associated with the second instruction set are not written to non-volatile storage.

Particular embodiments of the above disclosed computation system and methods permit automated management of the physical location of instructions and data, reducing programmer efforts to manage memory. In contrast, traditional code overlay memory management systems involve programmers that code memory management, requiring considerable effort, leading to higher cost and longer product-to-market times. In addition, the particular disclosed embodiments may reduce overall activity of non-volatile storage, such as hard drives, reducing power consumption. In contrast, traditional automated memory management techniques use different virtual address spaces for each task, leading to frequent writing and reading from non-volatile storage. Such frequent storage access consumes power, reducing battery life.

Embodiments of the computational system are useful in embedded systems. An embedded system is a special-purpose computer system, which is completely encapsulated by the device it controls. An embedded system has specific inputs and performs pre-defined tasks, unlike general purpose computer systems. Embodiments of the computational system are particularly useful for portable devices, such as portable audio and video players. In one particular embodiment, each of the tasks that the computational system is configured to perform is accessible via a common virtual memory space. Embodiments of the methods described above are also suited for use in limited application systems in which a limited number of tasks having memory profiles less than about 1 MB are performed. Exemplary methods may be implemented in software instructions executable by processors and logic units within devices and also stored in random access memory (RAM) or read only memory (ROM). Further, software instructions operable to perform the exemplary methods may be stored on a computer readable medium, such as solid state storage (e.g., RAM and ROM), optical storage (e.g., CDs and DVDs), and magnetic storage (e.g., floppy disks and hard drives).

The above-disclosed subject matter is to be considered illustrative, and not restrictive, and the appended claims are intended to cover all such modifications, enhancements, and other embodiments that fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computational system comprising:
a processor configured to access a virtual memory space to perform a first task of a plurality of tasks and configured to access the virtual memory space to perform a second task of the plurality of tasks, the virtual memory space referencing a first set of task instructions associated with the first task and referencing a second set of task instructions associated with the second task, the virtual memory space referencing non-instruction data associated with the first task;
cache memory accessible to the processor, the cache memory configured to store the first set of task instructions and the non-instruction data; and
a memory management unit accessible to the processor, the memory management unit configured to determine a physical memory location of the second set of task instructions, wherein the second set of task instructions is copied to volatile storage or to the cache memory directly from non-volatile storage when the second set of task instructions is accessed such that at least a portion of the first set of task instructions in the cache memory or in the volatile storage are overwritten by the second set of task instructions.

2. The computational system of claim 1, wherein the cache memory and the processor are located on a common substrate.

3. The computational system of claim 1, wherein the non-volatile storage is accessible to the processor.

4. The computational system of claim 1, wherein the non-volatile storage comprises NAND flash memory.

5. The computational system of claim 1, wherein when the second set of task instructions is copied to the cache memory, a portion of the first set of task instructions stored in the cache memory is overwritten by at least a portion of the second set of task instructions.

6. The computational. system of claim 1, wherein the first task is selected from the group consisting of a compressed file decoding task, a graphic generation task, and a user interface interaction task.

7. The computational system of claim 1, wherein the first task comprises a compressed file decoding task associated with execution of an algorithm selected from the group consisting of Movie Picture Experts Group (MPEG), Joint Photographic Experts Group (JPEG), Windows Media Audio (WMA), MPEG1 audio layer 3 (MP3), and Advanced Audio Coding (AAC).

8. The computational system of claim 1, wherein when the second set of task instructions is copied to the cache memory and a portion of non-instruction data stored in the cache memory is overwritten by a portion of the second set of task instructions.

9. The computational system of claim 1, wherein the processor is further configured to access the virtual memory space to perform the second task when executing the first set of task instructions.

10. A method of managing memory, the method comprising:
storing a first set of task instructions and first non-instruction data in cache memory, wherein the first set of task instructions and the first non-instruction data are associated with a first task;
accessing a second set of task instructions associated with a second task via a virtual address space, the virtual address space referencing the first set of task instructions, the second set of task instructions, and the first non-instruction data; and
storing the second set of task instructions in the cache memory when the second set of task instructions is accessed, wherein storing the second set of task instructions comprises overwriting a portion of the first set of task instructions stored in the cache memory or a portion of the first non-instruction data stored in the cache memory by copying the second set of task instructions directly from non-volatile storage accessible to the processor to the cache memory.

11. The method of claim 10, wherein storing the second set of task instructions in the cache memory further comprises overwriting a portion of the first non-instruction data stored in the cache memory with a portion of the second set of task instructions.

12. The method of claim 10, further comprising storing second. non-instruction data in the cache memory, wherein the second non-instruction data is associated with the second task.

13. The method of claim 12 wherein storing the second non-instruction data in the cache memory further comprises overwriting a portion of the first non-instruction data.

14. The method of claim 10, further comprising:
storing the first set of task instructions in the cache memory, and overwriting the second set of task instructions stored in the cache memory; and
accessing the first set of task instructions after having accessed the second set of task instructions via the virtual address space.

15. The method of claim 10 further comprising accessing the second set of task instructions when executing the first set of task instructions.

16. A computational system comprising computer implemented instructions executable by a processor to perform a method comprising:
storing a first set of task instructions and first non-instruction data in a cache memory, wherein the first set of task instructions and the first non-instruction data are associated with a first task;
accessing a second set of task instructions associated with a second task via a virtual address space, the virtual address space referencing the first set of task instructions, the second set of task instructions, and the non-instruction data; and
storing the second set of task instructions in the cache memory when the second set of task instructions is accessed, wherein storing comprises writing a read-only version of the second set of task instructions directly from non-volatile storage to the cache memory such that at least a portion of the first set of task instructions in the cache memory are overwritten by the second set of task instructions.

17. The computational system of claim 16 wherein the computational system comprises a portable audio player or a portable video player.

18. The computational system of claim 16, wherein the first task is selected from the group consisting of a compressed file decoding task, a graphic generation task, and a user interface interaction task.

* * * * *